United States Patent
Kulkarni et al.

(10) Patent No.: US 11,403,570 B2
(45) Date of Patent: Aug. 2, 2022

(54) INTERACTION-BASED PREDICTIONS AND RECOMMENDATIONS FOR APPLICANTS

(71) Applicant: Microsoft Technology Licensing, LLC, Redmond, WA (US)

(72) Inventors: Kedar U. Kulkarni, Berkeley, CA (US); Prateek Janardhan, San Francisco, CA (US); Mads Johnsen, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 551 days.

(21) Appl. No.: 16/020,720

(22) Filed: Jun. 27, 2018

(65) Prior Publication Data

US 2020/0005214 A1  Jan. 2, 2020

(51) Int. Cl.
*G06Q 10/06* (2012.01)
*G06K 9/62* (2022.01)
*G06N 20/00* (2019.01)
*G06F 16/9535* (2019.01)
*G06Q 50/00* (2012.01)

(52) U.S. Cl.
CPC . *G06Q 10/063112* (2013.01); *G06F 16/9535* (2019.01); *G06K 9/623* (2013.01); *G06N 20/00* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 9,569,735 B1* | 2/2017 | Zhu | G06F 16/24578 |
| 10,474,725 B2* | 11/2019 | Grover | G06F 16/248 |
| 10,536,554 B2* | 1/2020 | Chatterjee | H04L 67/22 |
| 2014/0244532 A1* | 8/2014 | Budzienski | G06Q 10/1053 705/321 |
| 2016/0196534 A1* | 7/2016 | Jarrett | G06Q 10/1053 705/321 |
| 2018/0121879 A1* | 5/2018 | Zhang | G06Q 10/1053 |
| 2018/0315019 A1* | 11/2018 | Kenthapadi | G06Q 10/1053 |
| 2019/0164133 A1* | 5/2019 | Chakraborty | G06Q 50/01 |
| 2019/0197487 A1* | 6/2019 | Jersin | G06F 16/9032 |

* cited by examiner

*Primary Examiner* — Patricia H Munson
*Assistant Examiner* — Marjorie Pujols-Cruz
(74) *Attorney, Agent, or Firm* — Schwegman Lundberg & Woessner, P.A.

(57) ABSTRACT

The disclosed embodiments provide a system for processing data. During operation, the system determines features related to an application for an opportunity by a member of an online network, wherein the features include a historical response rate for a poster of the opportunity and a submission number of the application for the opportunity. Next, the system applies a machine learning model to the features to produce a score representing a likelihood of the member receiving a response to the application from the poster. The system then compares the score to a threshold to determine a recommendation related to applying to the opportunity by the member. Finally, the system outputs the recommendation to improve an experience of applying to the opportunity.

20 Claims, 4 Drawing Sheets

INTERACTION-BASED PREDICTIONS AND RECOMMENDATIONS FOR APPLICANTS

BACKGROUND

Field

The disclosed embodiments relate to user recommendations. More specifically, the disclosed embodiments relate to techniques for performing interaction-based predictions and recommendations for applicants.

Related Art

Online networks may include nodes representing entities such as individuals and/or organizations, along with links between pairs of nodes that represent different types and/or levels of social familiarity between the entities represented by the nodes. For example, two nodes in an online network may be connected as friends, acquaintances, family members, and/or professional contacts. Online networks may further be tracked and/or maintained on web-based networking services, such as online professional networks that allow the entities to establish and maintain professional connections, list work and community experience, endorse and/or recommend one another, run advertising and marketing campaigns, promote products and/or services, and/or search and apply for jobs.

In turn, users and/or data in online professional networks may facilitate other types of activities and operations. For example, professionals may use an online professional network to locate prospects, maintain a professional image, establish and maintain relationships, and/or engage with other individuals and organizations. Similarly, recruiters may use the online professional network to search for candidates for job opportunities and/or open positions. At the same time, job seekers may use the online professional network to enhance their professional reputations, conduct job searches, reach out to connections for job opportunities, and apply to job listings. Consequently, use of online professional networks may be increased by improving the data and features that can be accessed through the online professional networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

Figure 1:
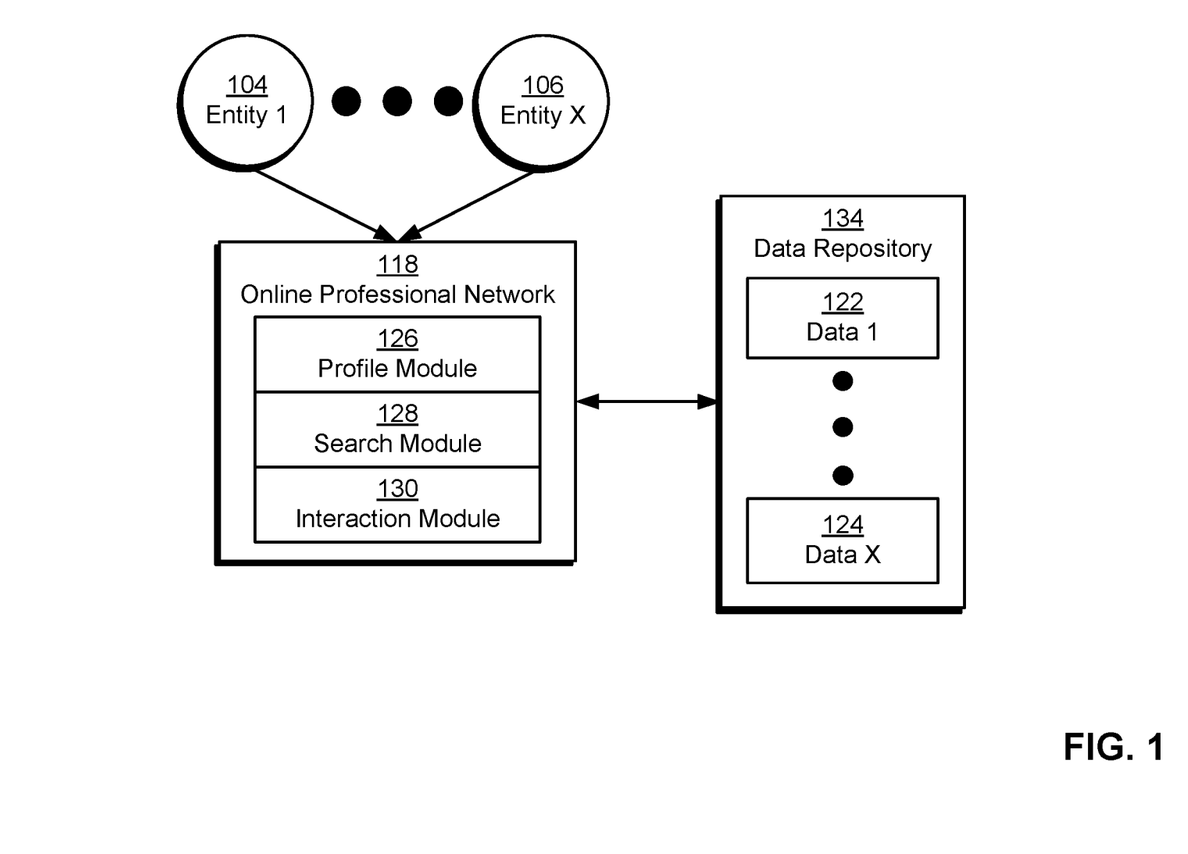
FIG. 1 shows a schematic of a system in accordance with the disclosed embodiments.

The disclosed embodiments provide a method, apparatus, and system for processing data. As shown in FIG. 1, the data may be associated with a user community, such as an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

More specifically, online professional network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online professional network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online professional network 118 also includes a search module 128 that allows the entities to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature in online professional network 118 to search for profiles, jobs, and/or information by categories such as first name, last name, title, company, school, location, interests, relationship, skills, industry, groups, salary, experience level, etc.

Online professional network 118 further includes an interaction module 130 that allows the entities to interact with one another on online professional network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online professional network 118 may include other components and/or modules. For example, online professional network 118 may include a homepage, landing page, and/or content feed that provides the latest posts, articles, and/or updates from the entities' connections and/or groups to the entities. Similarly, online professional network 118 may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online professional network 118 may be tracked and stored in a database, data warehouse, cloud storage, and/or other data-storage mechanism providing data repository 134.

Data in data repository 134 may then be used to generate recommendations and/or other insights related to listings of jobs or opportunities within online professional network 118. For example, one or more components of online professional network 118 may track searches, clicks, views, text input, conversions, and/or other feedback during the entities' interaction with a job search tool in online professional network 118. The feedback may be stored in data repository 134 and used as training data for one or more machine learning models, and the output of the machine learning model(s) may be used to display and/or otherwise recommend a number of job listings to current or potential job seekers in online professional network 118.

More specifically, data in data repository 134 and one or more machine learning models are used to produce rankings of candidates for jobs or opportunities listed within or outside online professional network 118. The candidates may include users who have viewed, searched for, or applied to jobs, positions, roles, and/or opportunities, within or outside online professional network 118. The candidates may also, or instead, include users and/or members of online professional network 118 with skills, work experience, and/or other attributes or qualifications that match the corresponding jobs, positions, roles, and/or opportunities.

After the candidates are identified, profile and/or activity data of the candidates may be inputted into the machine learning model(s), along with features and/or characteristics of the corresponding opportunities (e.g., required or desired skills, education, experience, industry, title, etc.). In turn, the machine learning model(s) may output scores representing the strength of the candidates with respect to the opportunities and/or qualifications related to the opportunities (e.g., skills, current position, previous positions, overall qualifications, etc.). For example, the machine learning model(s) may generate scores based on similarities between the candidates' profile data with online professional network 118 and descriptions of the opportunities. The model(s) may further adjust the scores based on social and/or other validation of the candidates' profile data (e.g., endorsements of skills, recommendations, accomplishments, awards, etc.). The rankings may then be generated by ordering the candidates in descending order of score.

In turn, the rankings and/or associated insights may improve the quality of the candidates and/or recommendations of opportunities to the candidates, increase user activity with online professional network 118, and/or guide the decisions of the candidates and/or moderators involved in screening for or placing the opportunities (e.g., hiring managers, recruiters, human resources professionals, etc.). For example, one or more components of online professional network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may recommend highly ranked candidates for a position to recruiters and/or other moderators as potential applicants and/or interview candidates for the position.

On the other hand, a large number of applications from members of online professional network 118 may fail to receive responses from hiring managers, recruiters, human resources professionals, and/or other entities involved in posting or placing the opportunities. For example, a large proportion of applications may be received for a relatively small number of opportunities, resulting in a low response rate to the applications. As a result, candidates may expend time and effort on applications that do not result in subsequent interaction or progress in the candidates' job searches, which may be discouraging to the candidates. At the same time, posters of the opportunities may be barraged with applications, thus precluding meaningful or effective review of the applications.

Figure 2:
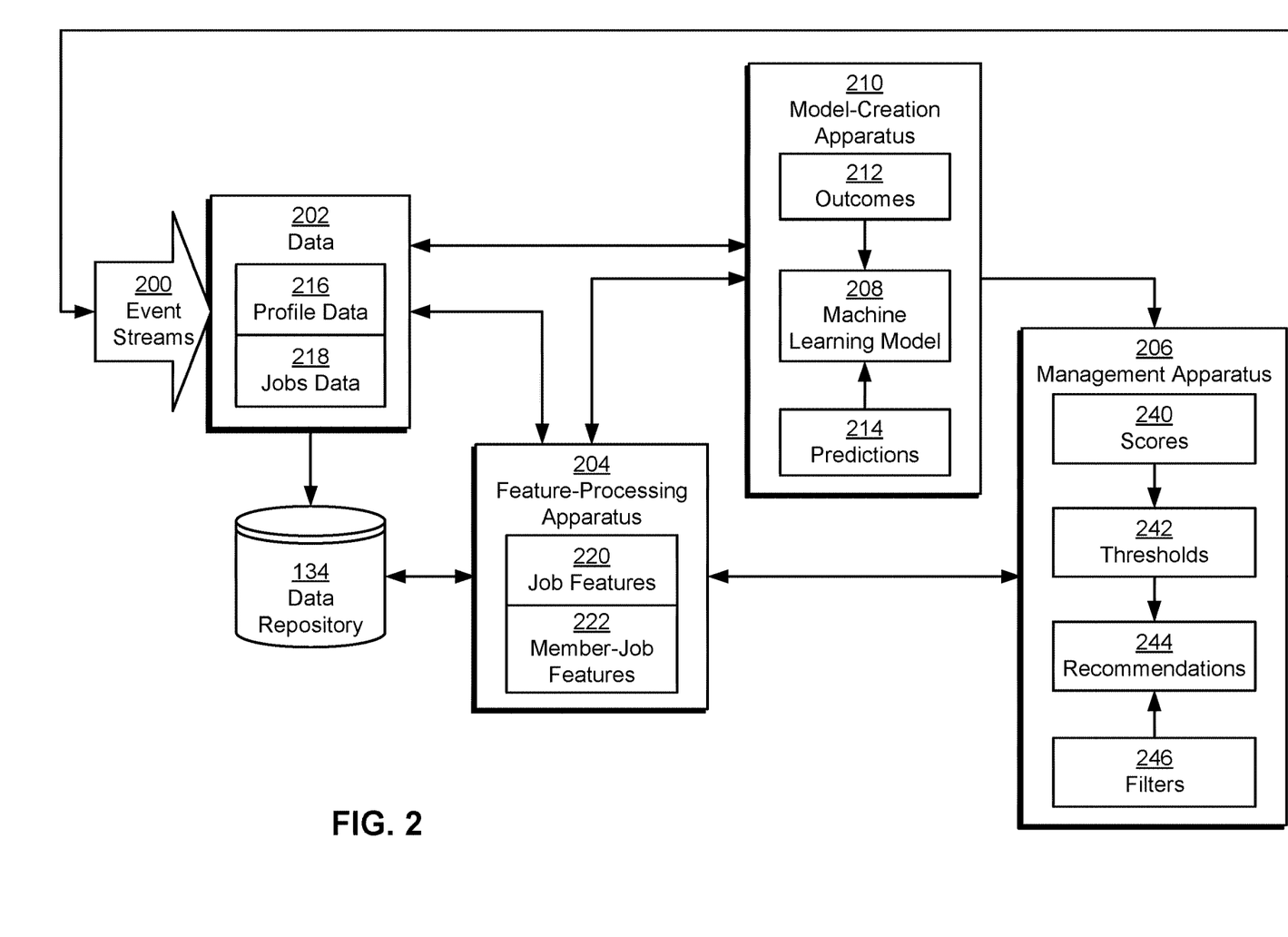
FIG. 2 shows a system for processing data in accordance with the disclosed embodiments.

In one or more embodiments, job searches and/or applications by members of online professional network 118 are improved by predicting the likelihood of responses to the applications by the moderators and generating recommendations based on the predicted likelihoods. For example, previously a member may unknowingly spend time and effort applying to an opportunity for which the member is unlikely to receive a response (e.g., because the opportunity is far along in the process and/or the member does not have the qualifications for the opportunity). However, the disclosed embodiments may allow the member to focus his time and resources on opportunities that are more likely to help him/her achieve his/her job-seeking goals by providing a predicted likelihood of response for a given job application. As shown in FIG. 2, a machine learning model 208 calculates scores 240 representing predictions 214 of likelihoods of receiving responses to applications for opportunities. For example, machine learning model 208 may be a logistic regression model that calculates a score from 0 to 1 representing the likelihood that a given member receives a response to a job application.

Input to machine learning model 208 includes job features 220 and/or member-job features 222, which are calculated by a feature-processing apparatus 204 using data 202 from data repository 134. As mentioned above, data 202 includes profile data 216 for members of a social network (e.g., online professional network 118 of FIG. 1) or other community of users, as well as jobs data 218 for jobs that are listed or described within or outside the social network. Profile data 216 may include data associated with member profiles in the community. For example, profile data 216 for an online professional network may include a set of attributes for each user, such as demographic (e.g., gender, age range, nationality, location, language), professional (e.g., job title, professional summary, professional headline, employer, industry, experience, skills, seniority level, professional endorsements), social (e.g., organizations to which the user belongs, geographic area of residence), and/or educational (e.g., degree, university attended, certifications, licenses) attributes. Profile data 216 may also include a set of groups to which the user belongs, the user's contacts and/or connections, patents or publications associated with the user, and/or other data related to the user's interaction with the community.

Attributes of the members may be matched to a number of member segments, with each member segment containing a group of members that share one or more common attributes. For example, member segments in the community may be defined to include members with the same industry, title, location, and/or language.

Connection information in profile data 216 may additionally be combined into a graph, with nodes in the graph representing entities (e.g., users, schools, companies, locations, etc.) in the community. Edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

Jobs data 218 may include structured and/or unstructured data for listings and/or descriptions of jobs or other opportunities that are posted by members of the community. For example, jobs data 218 for a given job or job listing may include a declared or inferred title, company, required or desired skills, responsibilities, qualifications, role, location, industry, seniority, salary range, benefits, and/or member segment. Jobs data 218 may also include records and/or statistics related to a recruiter, hiring manager, and/or other entity responsible for posting and/or placing a given position. For example, the information may track a historical response rate of the entity to applications for positions posted by the entity, the entity's success rate in filling the positions, and/or other metrics or attributes related to the entity's recruiting or hiring activity within or outside the community.

Profile data 216, jobs data 218, and/or other data 202 in data repository 134 may be standardized before the data is used by components of the system. For example, skills in profile data 216 and/or jobs data 218 may be organized into a hierarchical taxonomy that is stored in data repository 134 and/or another repository. The taxonomy may model relationships between skills (e.g., "Java programming" is related to or a subset of "software engineering") and/or standardize identical or highly related skills (e.g., "Java programming," "Java development," "Android development," and "Java programming language" are standardized to "Java").

Data 202 in data repository 134 may further be updated using records of recent activity received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the community may be generated in response to the activity. The record may then be propagated to components subscribing to event streams 200 on a nearline basis.

More specifically, feature-processing apparatus 204 obtains data 202 from event streams 200 and/or data repository 134 and uses data 202 to calculate job features 220 and member-job features 222 for a given member-opportunity pair. For example, feature-processing apparatus 204 may execute on an offline, period, or batch-processing basis to produce job features 220 and member-job features 222 for a large number of member-opportunity pairs (e.g., combinations of members in the community and jobs for which the members are qualified). In another example, feature-processing apparatus 204 may generate job features 220 and member-job features 222 in an online, nearline, and/or on-demand basis based on recent job-seeking activity by a member (e.g., a user session with the community, a job search, a job view, a click on a job, an application for a job, etc.).

Job features 220 may include attributes related to a listing of an opportunity. For example, job features 220 may include declared or inferred attributes of a job (e.g., from jobs data 218), such as the job's title, company (i.e., employer), industry, seniority, desired skill and experience, salary range, and/or location. One or more job features 220 may also be derived features that are generated from other types of features. For example, the job features may provide a context of each member's impression of a job listing or job description. The context may include a time and location at which the job listing or description is viewed by the member. The location can encompass physical and/or other types of locations, such as a geographic location, an application (e.g., native application, mobile application, web application, a specific version of an application, etc.), a website, and/or a web page.

Job features 220 may also, or instead, include attributes related to a poster of one or more listings of opportunities (e.g., a recruiter, human resources professional, hiring manager, etc.). For example, job features 220 may include the poster's historical response rate to job applications and/or historical success rate in placing jobs.

Member-job features 222 may include metrics and/or attributes related to the member's compatibility and/or interaction with a listing for a job or other type of opportunity. For example, member-job features 222 may include a submission number of a member's potential or existing application for an opportunity (i.e., the ordinal position of the application in a series of applications for the same opportunity that are ordered by time of submission). Thus, an application with a lower submission number may be received earlier than an application with a higher submission number. Member-job features 222 may also include a source of the member's application, which can include an onsite source within the community (e.g., a jobs module or feature) or an offsite source that is external to the community (e.g., a "careers" page on a company's external website).

Member-job features 222 may further include measures of compatibility and/or affinity between the member and opportunity. For example, member-job features 222 may include a match score between the member and the opportunity, which can be calculated based on overlap or commonality between the member's attributes in profile data 216 and the corresponding attributes in jobs data 218 for the opportunity (e.g., similarity in country, seniority, industry, and/or function between the member and opportunity). Member-job features 222 may also include a measure of connectedness of the member to an employer associated with the opportunity (e.g., whether the member has a connection to an employee of the employer, the number of connections the member has with employees of the employer, etc.).

Member-job features 222 may additionally include an affinity of the employer associated with the opportunity to an attribute of the member. For example, member-job features 222 may include a propensity of the employer associated with the opportunity for hiring from the current or past employer of the member. Finally, member-job features 222 may include a match in skills between the member and the opportunity, which can be calculated as a cross product, vector similarity (e.g., cosine similarity, Jaccard similarity, etc.), and/or other measure of similarity between the member's skills and skills mentioned or required in the description of the opportunity.

After job features 220 and member-job features 222 are calculated for one or more member-opportunity pairs, feature-processing apparatus 204 may store job features 220 and member-job features 222 in data repository 134 for subsequent retrieval and use. Feature-processing apparatus 204 may also, or instead, provide the features to a model-creation apparatus 210, management apparatus 206, and/or another component of the system for use in creating and/or executing machine learning model 208 using the features.

Model-creation apparatus 210 trains and/or updates machine learning model 208 using sets of job features 220 and member-job features 222, outcomes 212 associated with the feature sets, and predictions 214 produced from the feature sets. First, model-creation apparatus 210 and/or another component may input a set of features for each member-opportunity pair into machine learning model 208 to obtain a prediction representing the likelihood that the member receives a response from a poster of the opportunity, given an application of the member to the job. For example, the component may apply a logistic regression model to the features to produce a score from 0 to 1 that represents the probability that the poster responds to an application for the opportunity from the member.

Next, model-creation apparatus 210 may generate cohorts of members with similar predicted likelihoods from machine learning model 208. For example, model-creation apparatus 210 may group member-opportunity pairs into cohorts representing ranges of predicted likelihoods (e.g., 0-2%, 2-4%, 4-6%, etc.) for the corresponding applications. Model-creation apparatus 210 may also obtain outcomes 212 as binary values indicating whether the members did or did not receive responses to their applications. For each cohort, model-creation apparatus 210 may then calculate a response rate by dividing the number of members that received responses to their applications in the cohort by the total number of members in the cohort.

Finally, model-creation apparatus 210 may use differences between the range of predicted likelihoods represented by each cohort and the resulting response rate for the cohort to update parameters (e.g., coefficients, weights, etc.) of machine learning model 208. For example, model-creation apparatus 210 may use a training technique and/or one or more hyperparameters used to train machine learning model 208 to update parameter values of machine learning model 208 based on sets of job features 220 and member-job features 222 and the corresponding predictions 214 and outcomes 212. Model-creation apparatus 210 may then store updated parameter values and/or other data associated with machine learning model 208 in data repository 134 and/or another data store for subsequent retrieval and use.

After machine learning model 208 is created and/or updated by model-creation apparatus 210, management apparatus 206 obtains a representation of machine learning model 208 from model-creation apparatus 210, data repository 134, and/or another source. Next, management apparatus 206 uses machine learning model 208 and the corresponding job features 220 and member-job features 222 from feature-processing apparatus 204 to generate scores 240 for one or more member-opportunity pairs. As with generation of job features 220 and member-job features 222, scores 240 may be produced in an offline, batch-processing, and/or periodic basis (e.g., from batches of job features 220 and member-job features 222), or scores 240 may be generated in an online, nearline, and/or on-demand basis (e.g., when a member logs in to the community, views a job, performs a job search, applies for a job, and/or performs another action).

As discussed above, scores 240 may be representations of predictions 214 from machine learning model 208. For example, each score may reflect and/or indicate the likelihood that a member receives a response to an application for an opportunity, given a submission of the application by the member at the current time (or a virtual time represented by a submission number for the application). As a result, management apparatus 206 may use one or more thresholds 242 with scores 240 to derive insights related to response rates for applications and/or make recommendations 244 based on the insights.

For example, management apparatus 206 may set a threshold for scores 240 to a multiple (e.g., 2-3×) of the average response rate for all applications submitted by members of the community. When job features 220 and member-job features 222 for a given member-opportunity pair produce a score that exceeds the threshold, management apparatus 206 may output a notification, communication, and/or other indication to the member that the member has a high likelihood of receiving a response if the member submits an application for the opportunity. The indication may optionally include a representation of the score (e.g., "You have an 18% chance of hearing back if you apply to this job") to guide the member's subsequent job-seeking decisions and/or actions. Management apparatus 206 may also, or instead, output a partial or complete list of jobs for which the member has as high likelihood of receiving responses if the member applies to the jobs.

In another example, management apparatus 206 may set a threshold for scores 240 to a percentage of the average response rate for all applications submitted by members of the community. When job features 220 and member-job features 222 for a given member-opportunity pair produce a score that falls below the threshold, management apparatus 206 may output a notification, communication (e.g., email, text message, chat, voicemail, phone call, etc.), and/or other indication to the member that the member has a low chance of receiving a response if the member submits an application for the job. Management apparatus 206 may also, or instead, adjust a position of the job in a ranking or list of recommended jobs for the member and/or omit the job from the ranking or list of recommended jobs.

In a third example, management apparatus 206 may set a threshold for a subset of scores 240 based on attributes associated with the corresponding members, opportunities, and/or member-opportunity pairs. For example, the threshold may be based on the average response rate for applications for a certain type of opportunity (e.g., full time, part time, temporary, etc.) and/or a company, industry, seniority, location, position, and/or role associated with the opportunity. In another example, management apparatus 206 may adjust a threshold for a low and/or high likelihood of response on a per-member level based on historical response rates for the member's previous applications.

Prior to outputting recommendations 242, management apparatus 206 may filter recommendations 242 by one or more attributes. For example, management apparatus 206 may omit, from the outputted recommendations 242, recommendations related to members and/or opportunities associated with a high level of seniority (e.g., vice president and above). In another example, management apparatus 206 may suppress recommendations 242 for opportunities at a member's current employer. In a third example, management apparatus 206 may omit the generation and/or output of recommendations 242 for members and/or opportunities that are missing important feature values (e.g., members with little or no information or activity within the community, opportunities from posters for which historical response rates are not available, etc.).

Management apparatus 206 may optionally include, with the outputted recommendations 242, one or more factors that contribute to the corresponding scores 240. For example, management apparatus 206 may indicate that a member is more likely to receive a response to an application for an opportunity because the application would have a low submission number, the member has connections at the company associated with the opportunity (i.e., an employer with an opening represented by the opportunity), the member has a high match score with the opportunity, and/or the poster of the opportunity interacts with a relatively large proportion of applicants. Conversely, management apparatus 206 may specify that a member is less likely to receive a response to the application because the application would be submitted after hundreds or thousands of other applications, the member has no connections at the company, the member has a low match score with the opportunity, and/or the poster interacts with a relatively small proportion of applicants.

Management apparatus 206 and/or another component of the system may also, or instead, automatically submit or withdraw applications to opportunities based on scores 240 and/or thresholds 242. For example, the component may automatically submit an application for a member when a corresponding score from machine learning model 208 exceeds a threshold. In another example, the component may automatically withdraw an application (or prevent the job application from being shown to a poster of the corresponding listing) when a corresponding score from machine learning model 208 falls below a threshold. Such automatic actions may be performed, omitted, or customized based on preferences set by the members, posters, and/or other entities associated with applying to or placing jobs or opportunities.

By generating and outputting recommendations 244 related to applying to opportunities based on scores 240 that represent likelihoods of responses to the applications, the system of FIG. 2 may increase the overall response rate to the applications and/or improve the quality of applications. In turn, the system may improve the experience of the members in seeking or applying for the opportunities and/or the experience of recruiters, hiring managers, and/or other posters of the opportunities in screening for and/or filling the opportunities. Consequently, the system may improve technologies related to use of online networks, employment websites, and/or recruiting tools through network-enabled devices and/or applications, as well as user engagement, user experiences, and interaction through the online networks, employment websites, and/or recruiting tools.

Those skilled in the art will appreciate that the system of FIG. 2 may be implemented in a variety of ways. First, feature-processing apparatus 204, model-creation apparatus 210, management apparatus 206, and/or data repository 134 may be provided by a single physical machine, multiple computer systems, one or more virtual machines, a grid, one or more databases, one or more filesystems, and/or a cloud computing system. Feature-processing apparatus 204, model-creation apparatus 210, and management apparatus 206 may additionally be implemented together and/or separately by one or more hardware and/or software components and/or layers.

Second, a number of machine learning models and/or techniques may be used to generate scores 240. For example, the functionality of each machine learning model may be provided by a regression model, artificial neural network, support vector machine, decision tree, naïve Bayes classifier, Bayesian network, clustering technique, collaborative filtering technique, deep learning model, hierarchical model, and/or ensemble model. The retraining or execution of each machine learning model may also be performed on an offline, online, and/or on-demand basis to accommodate requirements or limitations associated with the processing, performance, or scalability of the system and/or the availability of features and outcomes 212 used to train the machine learning model. Multiple versions of a machine learning model may further be adapted to different subsets of members and/or opportunities (e.g., different member segments in the community), or the same machine learning model may be used to generate scores 240 for all members and/or all active job seekers in the community.

Third, the system of FIG. 2 may be adapted to predict interaction rates and/or make recommendations 224 for various types of opportunities. For example, the functionality of the system may be used to improve response rates and/or applications related to academic positions, artistic or musical roles, school admissions, fellowships, scholarships, competitions, club or group memberships, matchmaking, and/or other types of opportunities.

Figure 3:
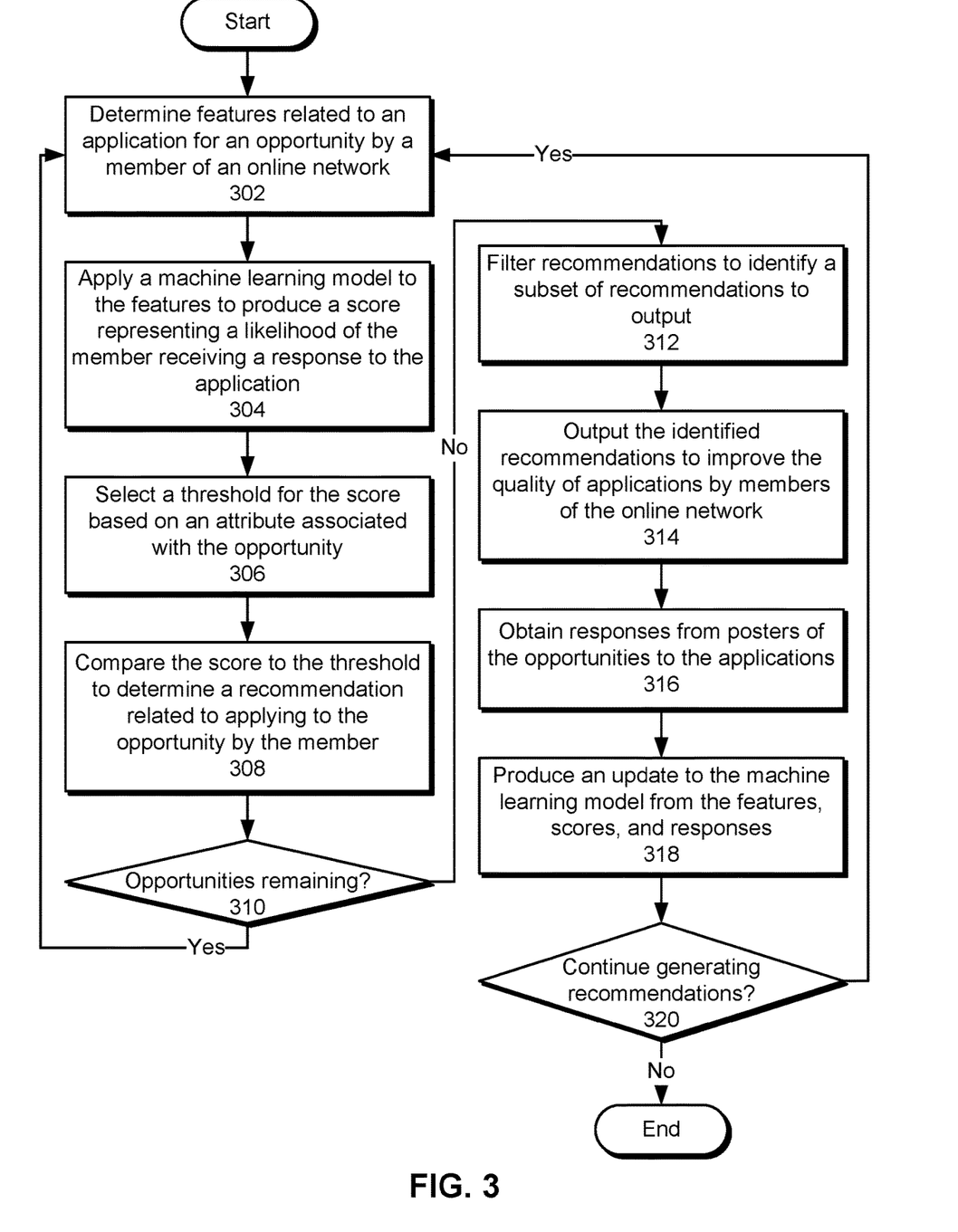
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, features related to an application for an opportunity by a member of an online network are determined (operation 302). The features may be related to the member, the opportunity, and/or a poster of the opportunity. For example, the features may include a historical response rate of the poster, a submission number of the application (i.e., the ordinal position of the application in a series of applications for the same opportunity that are ordered by time of submission), a source of the application (e.g., within the online network and/or external to the online network), a match score between the member and opportunity, a connectedness of the member to an employer associated with the opportunity, an affinity of the employer to an attribute of the member (e.g., current employer, past employer, school, awards, publications, skills, etc.), and/or a match in skills between the member and the opportunity.

Next, a machine learning model is applied to the features to produce a score representing a likelihood of the member receiving a response to the application (operation 304). For example, a logistic regression model may be used to calculate a score from 0 to 1 representing the probability that the poster responds to an application from the member.

A threshold is selected for the score based on an attribute associated with the opportunity (operation 306). For example, the threshold may be set to a percentage or a multiple of an average response rate across all applications. In another example, the threshold may be set based on an average or quantile response rate for a subset of applications associated with a given industry, location, company, seniority, title, role, position, and/or other attribute associated with the opportunity. The threshold may further be customized to reflect the historical rate of response to applications submitted by the member.

After the threshold is selected, the score is compared to the threshold to determine a recommendation related to applying to the opportunity by the member (operation 308). For example, the recommendation may include encouraging the member to apply to the opportunity and/or automatically submitting an application to the opportunity on the member's behalf when the score exceeds a threshold representing a high likelihood of response. Conversely, the recommendation may include discouraging the member from applying and/or withdrawing or hiding an application to the opportunity from the member when the score falls below a threshold representing a low likelihood of response.

Operations 302-308 may be repeated for remaining opportunities (operation 310) that are open to new applications. For example, a set of scores may be calculated and compared to one or more thresholds to determine recommendations related to applying to a given opportunity for a set of members that have expressed interest in the opportunity (e.g., members that have searched for, clicked on, and/or viewed the opportunity) and/or are qualified for the opportunity (e.g., members with education, work experience, skills, titles, seniorities, locations, and/or other attributes that meet the opportunity's requirements).

After recommendations are generated for a number of member-opportunity pairs, the recommendations are filtered to identify a subset of recommendations to output (operation 312). For example, the recommendations may be filtered to remove recommendations for members and/or opportunities associated with a certain level of seniority, recommendations for opportunities at a member's current employer, and/or recommendations for member-opportunity pairs that are missing important feature values.

The identified recommendations are then outputted to improve the quality of applications from members of the online network (operation 314). For example, the recommendations may include an indication of a high likelihood of a member receiving the response to the application and/or a list of jobs in which the member has a high likelihood of receiving responses from posters of the opportunities. Conversely, the recommendations may include indications of low likelihood of receiving responses to applications and/or reranking of recommended jobs to reflect the corresponding likelihoods of receiving responses. The recommendations may be shown with a notification of a closed opportunity, descriptions of the corresponding opportunities, and/or a list of recommended opportunities.

After the recommendations are outputted, responses from posters of the opportunities are obtained (operation 316), and an update to the machine learning model is produced from the features, scores and responses (operation 318). For example, the responses may represent outcomes associated with the scores and/or recommendations, which can be used with the corresponding scores and features to train and/or update the parameters of the machine learning model. The updated machine learning model may subsequently be used to generate scores for the same member-opportunity pairs and/or different member-opportunity pairs.

Recommendations may continue to be generated (operation 320) based on scores from the machine learning model. For example, recommendations may continue to be made to improve the user experience associated with applying to the opportunities and/or reviewing applications for the opportunities. To continue generating recommendations, features related to applications for the opportunities by individual members of the online network are determined (operation 302), and the latest version of the machine learning model is applied to the features to produce scores representing the members' likelihoods of receiving responses to the applications (operation 304). Thresholds are then selected and applied to the scores to determine the recommendations (operations 306-308), and the recommendations are filtered and outputted for a set of relevant opportunities (operations 310-314). Finally, responses from posters of the opportunities are obtained and used to update the machine learning model (operations 316-318). Such generation of recommendations and updating of the machine learning model may continue until the machine learning model is no longer used to produce predictions and/or recommendations related to interaction between applicants and posters of the opportunities.

Figure 4:
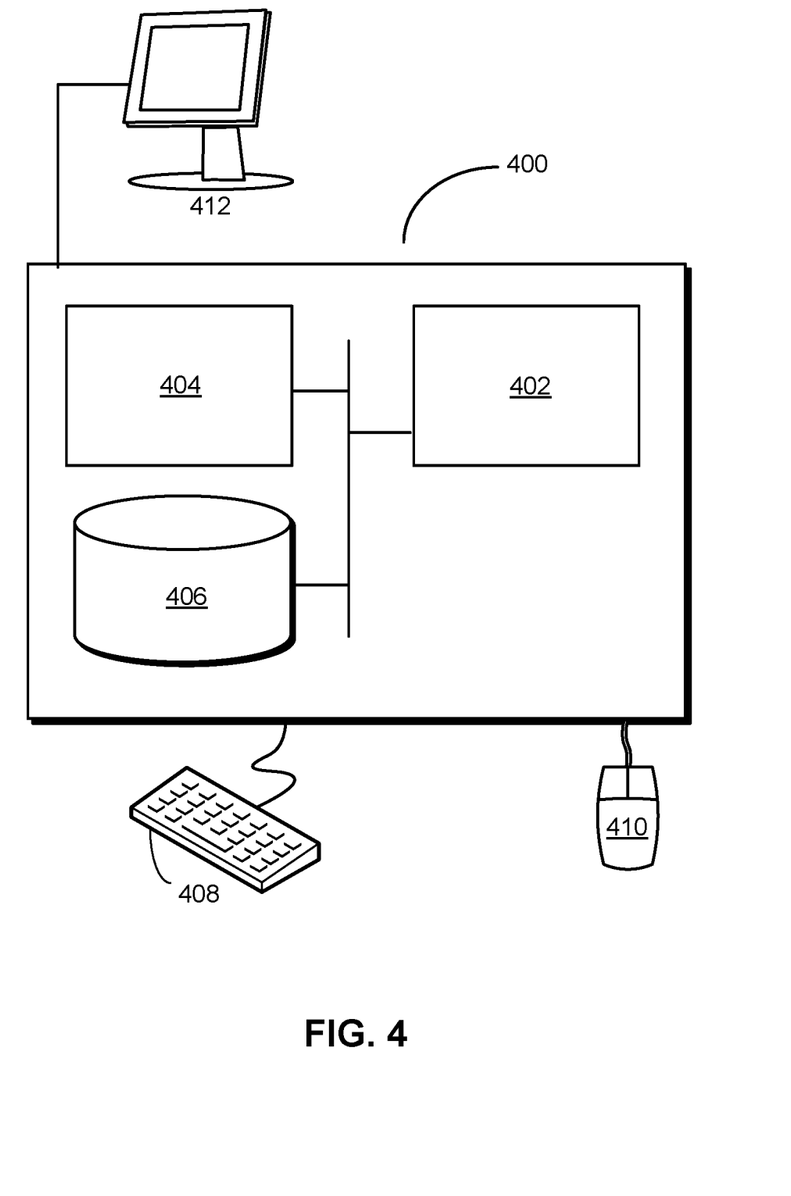
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system includes a feature-processing apparatus and a management apparatus, one or more of which may alternatively be termed or implemented as a module, mechanism, or other type of system component. The feature-processing apparatus determines features related to an application for an opportunity by a member of an online network. Next, the management apparatus applies a machine learning model to the features to produce a score representing a likelihood of the member receiving a response to the application from the poster. The management apparatus then compares the score to a threshold to determine a recommendation related to applying to the opportunity by the member. Finally, the management apparatus outputs the recommendation to improve a quality of applications from members of the online network and/or the user experience of applying to or placing opportunities.

In addition, one or more components of computer system 400 may be remotely located and connected to the other components over a network. Portions of the present embodiments (e.g., feature-processing apparatus, model-creation apparatus, management apparatus, data repository, online professional network, etc.) may also be located on different nodes of a distributed system that implements the embodiments. For example, the present embodiments may be implemented using a cloud computing system that generates interaction-based recommendations for a set of remote members applying to opportunities within or through an online network.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   determining, by one or more computer systems, features related to a job posting in an online network and features related to a first member of the online network, wherein the features related to the job posting comprise (a) a historical response rate, of a poster of the job posting, to applications submitted and (b) a number of submissions of applications already received for the job posting;
   applying, by the one or more computer systems, a machine learning model to the features related to the job posting and the features related to the first member to produce a score representing a likelihood of the first member receiving any response, from the poster, to an application made by the first member for the job posting;
   comparing the score to a threshold to determine a recommendation related to applying to the job posting by the member;
   outputting the recommendation to the member;
   receiving an application for the job posting from the first member;
   receiving from the poster of the job posting a response to the application by the member;
   updating the machine learning model using the features, the score, and the received response; and
   applying the updated machine learning model to a different member-job posting pair.

2. The method of claim 1, further comprising:
   obtaining additional features related to a batch of applications, scores generated by the machine learning model from the additional features, and responses from posters of job postings to the batch of applications;
   producing an update to the machine learning model from the additional features, the scores, and the responses; and
   applying the update to subsequent features related to subsequent applications to the one or more job postings to produce subsequent scores representing likelihoods of receiving responses to the subsequent applications.

3. The method of claim 1, further comprising:
   selecting the threshold based on an attribute of the job posting.

4. The method of claim 1, further comprising:
   filtering a set of recommendations related to applying to one or more job postings by the member to identify a subset of the recommendations to output, wherein the subset of the recommendations comprises the recommendation.

5. The method of claim 4, wherein the set of potential recommendations is filtered based on at least one of:
   a seniority of the member;
   a current employer of the member; and
   a lack of a feature inputted into the machine learning model.

6. The method of claim 1, wherein the recommendation comprises at least one of:
   an indication of a high likelihood of the member receiving the response to the application; and
   a list of jobs in which the member has the high likelihood of receiving responses from posters of one or more job postings.

7. The method of claim 1, wherein the recommendation is outputted with at least one of:
   a notification of a closed job posting;
   a description of the job posting; and
   a list of recommended job postings.

8. The method of claim 1, wherein the recommendation comprises a factor that affects the likelihood of the member receiving the response to the application from the poster.

9. The method of claim 1, wherein the features further comprise at least one of:
   a source of the application; and
   a match score between the member and the job posting.

10. The method of claim 1, wherein the features further comprise a connectedness of the member to an employer associated with the job posting.

11. The method of claim 1, wherein the features further comprise an affinity of an employer associated with the job posting to an attribute of the member.

12. The method of claim 1, wherein the features further comprise a match in skills between the member and the job posting.

13. A system, comprising:
   one or more processors; and
   memory storing instructions that, when executed by the one or more processors, cause the apparatus to:

determine, by one or more computer systems, features related to a job posting in an online network and features related to a first member of the online network, wherein the features related to the job posting comprise (a) a historical response rate, of a poster of the job posting, to applications submitted and (b) a number of submissions of applications already received for the job posting;

apply, by the one or more computer systems, a machine learning model to the features related to the job posting and the features related to the first member to produce a score representing a likelihood of the first member receiving any response, from the poster, to an application made by the first member for the job posting;

compare the score to a threshold to determine a recommendation related to applying to the job posting by the member;

output the recommendation to the member;

receive an application for the job posting from the first member;

receive from the poster of the job posting a response to the application by the member;

update the machine learning model using the features, the score, and the received response; and apply the updated machine learning model to a different member-job posting pair.

14. The system of claim 13, wherein the memory further stores instructions that, when executed by the one or more processors, cause the system to:

obtain additional features related to a batch of applications, scores generated by the machine learning model from the additional features, and responses from posters of one or more job postings;

produce an update to the machine learning model from the additional features, the scores, and the responses; and apply the update to subsequent features related to subsequent applications to the one or more job postings to produce subsequent scores representing likelihoods of receiving responses to the subsequent applications.

15. The system of claim 13, wherein the memory further stores instructions that, when executed by the one or more processors, cause the system to:

filter a set of recommendations related to applying to one or more job posting by the member to identify a subset of the recommendations to output, wherein the subset of the recommendations comprises the recommendation.

16. The system of claim 13, wherein the recommendation comprises at least one of:

an indication of a high likelihood of the member receiving the response to the application;

a list of jobs in which the member has the high likelihood of receiving responses from posters of the one or more job postings; and a factor that affects the likelihood of the member receiving the response to the application from the poster.

17. The system of claim 13, wherein the recommendation is outputted with at least one of:

a notification of a closed job posting;

a description of the job posting; and a list of recommended job postings.

18. The system of claim 13, wherein the features further comprise at least one of:

a source of the application;

a match score between the member and the job posting; and a connectedness of the member to an employer associated with the job posting.

19. The system of claim 13, wherein the features further comprise at least one of:

an affinity of an employer associated with the job posting to an attribute of the member; and a match in skills between the member and the job posting.

20. A non-transitory computer-readable storage medium storing instructions that when executed by a computer cause the computer to perform a method, the method comprising:

determining, by one or more computer systems, features related to a job posting in an online network and features related to a first member of the online network, wherein the features related to the job posting comprise (a) a historical response rate, of a poster of the job posting, to applications submitted and (b) a number of submissions of applications already received for the job posting;

applying, by the one or more computer systems, a machine learning model to the features related to the job posting and the features related to the first member to produce a score representing a likelihood of the first member receiving any response, from the poster, to an application made by the first member for the job posting;

comparing the score to a threshold to determine a recommendation related to applying to the job posting by the member;

outputting the recommendation to the member;

receiving an application for the job posting from the first member;

receiving from the poster of the job posting a response to the application by the member;

updating the machine learning model using the features, the score, and the received response; and applying the updated machine learning model to a different member-job posting pair.

* * * * *